United States Patent
Zhang et al.

(10) Patent No.: US 8,374,745 B2
(45) Date of Patent: Feb. 12, 2013

(54) TELEMATICS-ENABLED AGGREGATED VEHICLE DIAGNOSIS AND PROGNOSIS

(75) Inventors: Yilu Zhang, Northville, MI (US); Nathan D. Ampunan, Novi, MI (US); Mark J. Rychlinski, Farmington Hills, MI (US); Mark N. Howell, Rochester Hills, MI (US); Xiaodong Zhang, Mason, OH (US); Krishnaraj Inbarajan, Troy, MI (US); John J. Correia, Livonia, MI (US); Mutasim A. Salman, Rochester Hills, MI (US); Mark E. Gilbert, Ann Arbor, MI (US); Paul W. Loewer, South Lyon, MI (US); Shirley B. Dost, Canton, MI (US)

(73) Assignees: GM Global Technology Operations LLC, Detroit, MI (US); General Motors LLC, Detroit, MI (US)

( * ) Notice: Subject to any disclaimer, the term of this patent is extended or adjusted under 35 U.S.C. 154(b) by 938 days.

(21) Appl. No.: 12/205,023

(22) Filed: Sep. 5, 2008

(65) Prior Publication Data

US 2010/0063668 A1 Mar. 11, 2010

(51) Int. Cl.
  *G06F 19/00* (2011.01)
(52) U.S. Cl. .................. 701/29.3; 701/31.4; 701/32.1
(58) Field of Classification Search .................. 701/29, 701/30, 33, 35, 29.3, 31.4, 32.1
  See application file for complete search history.

(56) References Cited

U.S. PATENT DOCUMENTS

| | | | |
|---|---|---|---|
| 5,041,976 A * | 8/1991 | Marko et al. ................... 701/29 |
| 5,602,733 A * | 2/1997 | Rogers et al. ................... 701/29 |
| 6,175,787 B1 * | 1/2001 | Breed ................................ 701/29 |
| 6,366,199 B1 * | 4/2002 | Osborn et al. ................. 340/438 |
| 6,374,261 B1 * | 4/2002 | Alvarez et al. ................... 706/45 |
| 6,480,810 B1 * | 11/2002 | Cardella et al. ............... 702/188 |
| 6,609,051 B2 * | 8/2003 | Fiechter et al. ................. 701/33 |
| 6,636,790 B1 * | 10/2003 | Lightner et al. ................. 701/33 |
| 6,735,506 B2 * | 5/2004 | Breed et al. ..................... 701/36 |
| 6,768,935 B1 * | 7/2004 | Morgan et al. ................... 701/29 |
| 6,876,908 B2 * | 4/2005 | Cramer et al. ................... 701/30 |
| 6,879,893 B2 * | 4/2005 | Woodard et al. ................. 701/29 |
| 7,082,359 B2 * | 7/2006 | Breed ............................... 701/36 |
| 7,092,937 B2 * | 8/2006 | Morgan et al. ................ 707/736 |
| 7,715,961 B1 * | 5/2010 | Kargupta ........................ 701/33 |
| 7,725,275 B2 | 5/2010 | Zhang et al. |
| 2002/0007237 A1 * | 1/2002 | Phung et al. .................... 701/33 |
| 2002/0016655 A1 * | 2/2002 | Joao ............................... 701/35 |
| 2002/0049720 A1 * | 4/2002 | Schmidt ............................ 707/1 |
| 2002/0128876 A1 * | 9/2002 | Mahoney et al. .................. 705/4 |
| 2002/0161495 A1 * | 10/2002 | Yamaki .......................... 701/33 |
| 2005/0182534 A1 * | 8/2005 | Legate et al. ................... 701/29 |
| 2006/0069473 A1 * | 3/2006 | Sumcad et al. ................. 701/29 |
| 2006/0271255 A1 * | 11/2006 | Stott et al. ...................... 701/29 |
| 2007/0150196 A1 | 6/2007 | Grimm |
| 2007/0271014 A1 * | 11/2007 | Breed ............................. 701/29 |

(Continued)

*Primary Examiner* — Darnell Jayne
*Assistant Examiner* — Sasha T Varghese
(74) *Attorney, Agent, or Firm* — John A. Miller; Miller IP Group, PLC

(57) ABSTRACT

A system and method for telemetrically collecting on-road vehicle diagnostic data. In one embodiment, the method includes collecting vehicle diagnostic data from service shops, on-road vehicles and warranty records, aggregating the collected data and extracting knowledge therefrom. The extracted knowledge can be used to enhance algorithms on-board vehicles or at service centers so as to better identify vehicle faults and provide enhanced diagnostics and prognostics. The enhanced algorithms can then be used to provide predictive maintenance suggestions, provide trouble shooting assistance or provide vehicle design improvements.

14 Claims, 1 Drawing Sheet

U.S. PATENT DOCUMENTS

2007/0283188 A1* 12/2007 Balzer et al. .................... 714/26
2008/0004764 A1* 1/2008 Chinnadurai et al. .......... 701/29
2009/0138141 A1* 5/2009 Nwadiogbu et al. .............. 701/3
2009/0138153 A1* 5/2009 Mylaraswamy et al. ....... 701/33

* cited by examiner

TELEMATICS-ENABLED AGGREGATED VEHICLE DIAGNOSIS AND PROGNOSIS

BACKGROUND OF THE INVENTION

1. Field of the Invention

This invention relates generally to a system and method for collecting on-road vehicle data and, more particularly, to a system and method for collecting data from on-road vehicles, providing data aggregation and knowledge extraction from the collected data and providing enhanced fault isolation and predicted maintenance services from the extracted knowledge.

2. Discussion of the Related Art

Modern vehicles typically include several systems that are designed to increase vehicle safety, increase driver comfort, increase driver convenience, etc. As more and more such systems are added to vehicles, vehicle electronics, devices and electrical systems are becoming much more complex. Many electrical, control and software related faults associated with vehicle systems are intermittent or may only occur under certain conditions. Thus, a problem that a vehicle customer may experience on the road may not be able to be duplicated when the vehicle is taken to a service provider. This results in vehicle system, sub-system and component diagnosis and prognosis being much more difficult. Because a service technician may not be able to duplicate a problem, it is generally not possible to trouble shoot the problem for these situations. Further, because of the number of components and devices employed in these vehicle systems, it is generally a challenge to define all of the fault conditions for these components and devices that may exist. As a result, there is a significant number of service reports stating no trouble found (NTF) or customer concern not duplicated.

SUMMARY OF THE INVENTION

In accordance with the teachings of the present invention, a system and method are disclosed for telemetrically collecting on-road vehicle diagnostic data. In one embodiment, the method includes collecting vehicle diagnostic data from service shops, on-road vehicles and warranty records, aggregating the collected data and extracting knowledge therefrom. The extracted knowledge can be used to enhance algorithms on-board vehicles or at service centers so as to better identify vehicle faults and provide enhanced diagnostics and prognostics. The enhanced algorithms can then be used to provide predictive maintenance suggestions, provide trouble shooting assistance or provide vehicle design improvements.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for telematically acquiring vehicle data while the vehicle is on the road is merely exemplary in nature, and is in no way intended to limit the invention or its applications or uses.

The present invention proposes a process for collecting vehicle data while the vehicle is on the road, and using the data to provide fault detection and preventative maintenance. The process involves three major steps including remotely collecting data from on-road vehicles, identifying shared fault symptoms and common failure precursors through mining of the data, and providing enhanced fault isolation and predictive maintenance service. Collecting the data includes continuously uploading data from on-road vehicles, including parametric data and abstract data, such as trouble or diagnostic codes. Collecting the data can also include uploading vehicle repair information from service shops, such as dealers, subscribed garages, etc. Further, the best trouble shooting practices can be uploaded from service shops. For extracting the knowledge, the data is mined at an appropriate location to identify shared symptoms and common precursors for the same or similar repairs. Various techniques can be employed for the data mining including, but not limited to, association rule learning, decision trees, and other data mining and pattern recognition methods. The data can be converted into knowledge represented by an inference engine or a service procedure. Any suitable case based reasoning procedure can be employed, such as a Bayesian network. Providing service can include providing trouble shooting assistance to technicians and service shops. Service procedures can be updated through publications. Inference engines can be used at OEM technician support centers to answer phone calls. Further, service can provide predictive maintenance suggestions to vehicle owners, individuals, fleet managers, etc. Service features can also include providing design improvement suggestions to OEMs.

Figure 1:
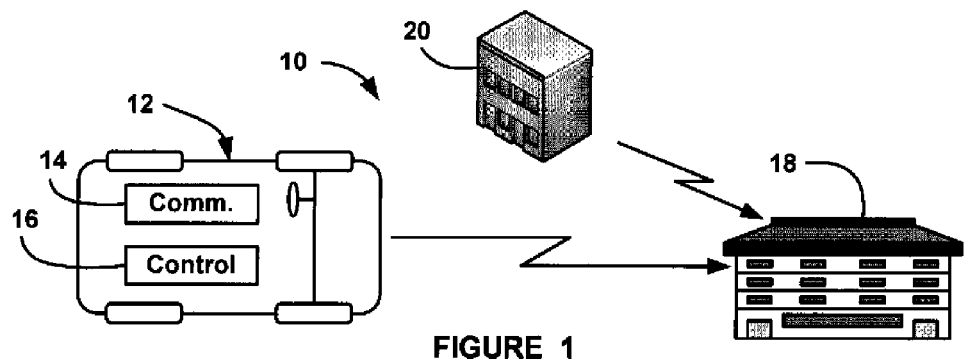
FIG. 1 is a plan view of a network including a vehicle having a wireless communications system for transmitting vehicle data of the operation of the vehicle while the vehicle is on the road, according to an embodiment of the present invention.

FIG. 1 is a plan view of a communication network 10 including a vehicle 12 having a wireless communications system 14. A vehicle controller 16 receives various signals from vehicle systems, sub-systems and components, and collects diagnostic codes and other signals from these systems and devices that identify the operation of the vehicle 12. The data can be provided to the wireless communications system 14 that will broadcast the data to an appropriate facility 18 consistent with the discussion herein. Information and other data concerning vehicle diagnosis and prognosis can also be sent to the facility 18 from other facilities 20, such as service shops, warranty records facilities, etc. The information sent to the facility 18 concerning vehicle diagnostics and prognostics is not limited to a particular facility, a particular number of vehicles, a particular type of vehicle, etc., but is only limited by the amount and type of information that is desired to be received consistent with the discussion herein.

Figure 2:
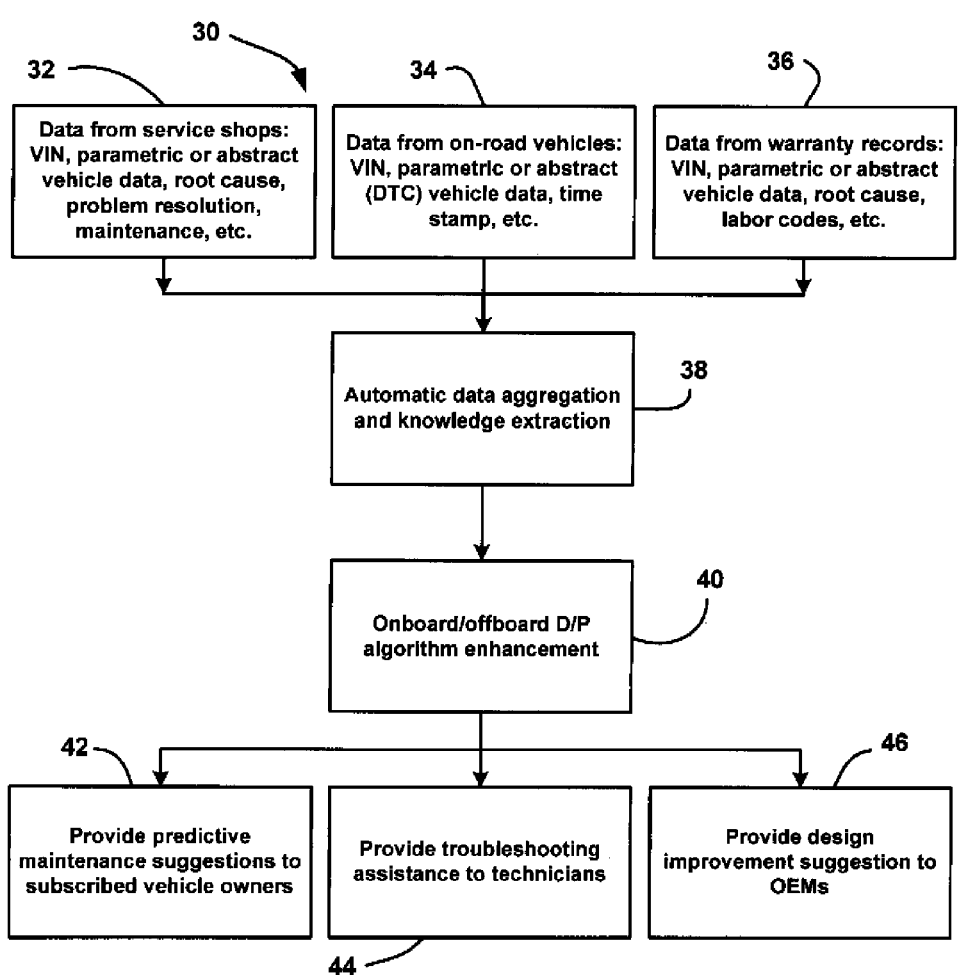
FIG. 2 is a flow chart diagram showing a process for acquiring and using data collected telematically from a vehicle, according to an embodiment of the present invention.

FIG. 2 is a flow chart diagram 30 showing a process for collecting vehicle data and analyzing the data, according to an embodiment of the present invention. At box 32, vehicle data is collected from service shops, such as the service shop 20, when a vehicle is repaired or otherwise serviced. This data can include various things, such as vehicle identification number (VIN), parametric or abstract vehicle data, root cause data, problem resolution information, maintenance records, etc. Further, data is also collected from on-road vehicles, such as the vehicle 12, at box 34. As discussed above, data can be continuously collected on the vehicle 12, and continuously transmitted to the data facility 18, or can be collected when a problem is perceived where the data could be transmitted just before the problem and during the problem. The data collected from on-road vehicles can include the VIN, parametric or abstract vehicle data, time stamps, etc. Further, data from warranty records can be collected at box 36, such as when the vehicle goes into the repair shop for warranty service or other warranty information that is available. This data can include the VIN, parametric or abstract vehicle data, root cause data, labor codes, etc.

The collected data from the three identified locations is then transmitted or sent to a particular facility, such as the facility 18, where it is automatically aggregated and knowledge is extracted therefrom at box 38. This automatic aggregation of the data collected from the various sources and the knowledge extraction can be performed in any suitable manner to identify shared symptoms and common precursors for similar repairs. Various processes and algorithms can be used, such as association rule learning, support vector machine operations, and other data mining and pattern recognition techniques. Thus, if symptoms have been seen and documented before, and adequately corrected, then the same service procedures can be used again for the new vehicle with the same problem.

When a technician is working on a new vehicle with an old problem he can access the data base by any suitable manner to look for that problem to determine the proper fix for the vehicle. At box 40, the data that has been collected and extracted by the various learning algorithms discussed above can then be used either in an on-board or off-board manner using enhanced diagnosis and prognosis algorithms that are used to identify vehicle problems. For example, the algorithms that may be on a vehicle that are used to look at diagnostic codes and vehicle information to determine whether a problem exists can be upgraded using information that has been collected from other vehicles that may identify the same problem from the same symptoms. Further, algorithms that are used at dealerships or other service locations can also be enhanced where a vehicle symptom can be put into the database to identify a particular vehicle problem to allow the technician to more readily and more easily correct the problem. The extracted knowledge can be used by an inference engine or other service procedure using, for example, case based reasoning, Bayesian networks, rule database techniques or other reasoning engines.

Now that the algorithms have been upgraded to provide better vehicle service either on-board the vehicle or at the service facility, the enhanced algorithm can be used in various manners. For example, the algorithms can be used to provide predictive maintenance suggestions to vehicle owners at box 42. Particularly, if the vehicle sees a combination of signals that has been known in the past to come before a particular problem, a suitable warning light or other attention device can be provided that lets the vehicle owner know that service should be provided before the actual problem occurs. In this situation, the technician at the service center will be able to look at the vehicle controller to know what specific potential problem may happen. Additionally, the algorithms can provide trouble shooting assistance to technicians who are attempting to fix a problem when a vehicle owner brings a vehicle into a service center at box 44. This can be accomplished in various ways, such as updating service procedures through web publications, distributing inference engines, through software updates or otherwise, through tools, such as tech-2 devices, and using an inference engine and OEM technician support centers to answer phone calls. Further, the information relating to potential vehicle problems from the enhanced algorithms can be used by OEMs to provide design improvements at box 46.

A number of examples can be given to show some of the benefits of the invention as described above. One example includes fault isolation where a significant number of field vehicles experience the co-occurrence of various problems, such as ECU performance DTC codes, lost communication DTC codes and weak ignition. The service shop can use this information to first check the battery status if the combination of ECU performance DTCs and lost communication DTCs appear on a vehicle. Further, failure prediction can be performed as discussed above, such as a significant number of field vehicles experiencing certain combinations of DTC codes or certain time-series patterns of battery current/voltage within two months for a no-start situation. The failure prediction software can alert the vehicle owner to have the battery checked if these faults occur. For design improvement, if a particular vehicle line experiences battery state of charge deterioration for a popular/regular driving pattern, such as 10-40 miles weekday driving and less than 10 miles weekend driving, the algorithm can suggest a revision of generator size or battery size for the vehicle line.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for collecting and analyzing vehicle data, said method comprising:
    collecting data from service shops;
    collecting data from on-road vehicles using wireless communications, where the vehicles use a microprocessor for monitoring and transmitting the data;
    collecting warranty record data;
    automatically aggregating the collected data and using knowledge extraction to extract information from the aggregated data;
    providing on-board and off-board diagnosis and prognosis algorithm enhancement using the extracted information, where providing the algorithm enhancement includes using case based reasoning, Bayesian networks, rule data bases or a reasoning engine; and upgrading each vehicle's algorithms using problem information collected from the other on-road vehicles, and
    using the enhanced algorithms to provide various vehicle services.

2. The method according to claim 1 wherein using the enhanced algorithms includes providing predictive maintenance suggestions to a vehicle owner.

3. The method according to claim 1 wherein using the enhanced algorithms includes providing troubleshooting assistance to technicians.

4. The method according to claim 1 wherein using the enhanced algorithms includes providing design improvement suggestions.

5. The method according to claim 1 wherein collecting data from the service shops includes collecting vehicle identification numbers, parametric or abstract vehicle data, root cause data, problem resolution data and maintenance data.

6. The method according to claim 1 wherein collecting data from on-road vehicles includes collecting vehicle identification numbers, parametric or abstract vehicle data and time stamp data.

7. The method according to claim 1 wherein collecting warranty data includes collecting vehicle identification numbers, parametric or abstract vehicle data, root cause data and labor codes.

8. The method according to claim 1 wherein the automatic data aggregation and knowledge extraction includes using an algorithm selected from the group consisting of association rule learning and support vector machine learning.

9. The method according to claim 1 wherein collecting data from on-road vehicles includes collecting data continuously from on-road vehicles or collecting data only when a potential problem is identified on the vehicle.

10. A method for collecting and analyzing vehicle data, said method comprising:
- collecting data from service shops, including vehicle identification numbers, parametric or abstract vehicle data, root cause data, problem resolution data and maintenance data;
- collecting data from on-road vehicles using wireless communications, where the vehicles use a microprocessor for monitoring and transmitting the data;
- collecting warranty record data;
- aggregating the collected data and using knowledge extraction to extract information from the aggregated data; and
- providing on-board and off-board vehicle diagnosis and prognosis and failure prediction using the extracted information, wherein the on-board diagnosis and prognosis and failure prediction of each vehicle is upgraded using problem information collected from the other on-road vehicles.

11. The method according to claim 10 further comprising using the extracted information for providing predictive maintenance suggestions to a vehicle owner.

12. The method according to claim 10 further comprising using the extracted information for providing troubleshooting assistance to technicians.

13. The method according to claim 10 further comprising using the extracted information for providing design improvement suggestions.

14. The method according to claim 10 wherein the data aggregation and knowledge extraction includes using an algorithm selected from the group consisting of association rule learning and support vector machine learning.

* * * * *